US009024253B2

(12) United States Patent
De Ruyter et al.

(10) Patent No.: US 9,024,253 B2
(45) Date of Patent: May 5, 2015

(54) CALIBRATION SYSTEM FOR DETECTOR

(75) Inventors: Howard M. De Ruyter, Palos Verdes Estates, CA (US); James Steven Blackmon, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 45 days.

(21) Appl. No.: 13/590,685

(22) Filed: Aug. 21, 2012

(65) Prior Publication Data

US 2014/0054452 A1    Feb. 27, 2014

(51) Int. Cl.
| | |
|---|---|
| *G01D 18/00* | (2006.01) |
| *G01J 1/08* | (2006.01) |
| *G01J 5/04* | (2006.01) |
| *G01J 1/04* | (2006.01) |
| *G01J 5/52* | (2006.01) |
| *G01J 5/08* | (2006.01) |

(52) U.S. Cl.
CPC .. *G01J 1/08* (2013.01); *G01J 5/047* (2013.01); *G01J 1/0414* (2013.01); *G01J 5/522* (2013.01); *G01J 5/0809* (2013.01)

(58) Field of Classification Search
CPC ................................. G01J 5/522; G01C 25/00
USPC ...................................................... 250/252.1
See application file for complete search history.

(56) References Cited

U.S. PATENT DOCUMENTS

| | | | |
|---|---|---|---|
| 4,482,252 A | 11/1984 | Lorenz | |
| 5,343,040 A | 8/1994 | Wiese et al. | |
| 6,127,679 A * | 10/2000 | Ashley et al. | 250/252.1 |
| 6,175,113 B1 * | 1/2001 | Ashley et al. | 250/334 |
| 7,592,588 B2 | 9/2009 | Moskun et al. | |

FOREIGN PATENT DOCUMENTS

| | | |
|---|---|---|
| FR | 2498764 A1 | 7/1982 |
| GB | 1273707 A | 5/1972 |

* cited by examiner

*Primary Examiner* — Marcus Taningco
(74) *Attorney, Agent, or Firm* — Lando & Anastasi, LLP

(57) ABSTRACT

A calibration system and method for calibrating a detector are disclosed. In one example, the calibration system comprises a plurality of radiation sources configured to emit electromagnetic radiation, a positioning mechanism disposed opposite the plurality of radiation sources, having a single degree of freedom with respect to the plurality of radiation sources, and an optical element coupled to the positioning mechanism, and configured to rotate to a plurality of calibration positions, the optical element in each of the plurality of calibration positions being configured to receive the electromagnetic radiation from a corresponding radiation source and to reflect the electromagnetic radiation to the detector.

18 Claims, 8 Drawing Sheets

CALIBRATION SYSTEM FOR DETECTOR

GOVERNMENT RIGHTS

The This invention was made with government support under Grant No. [withheld] awarded by [federal agency withheld]. The U.S. government has certain rights in this invention.

BACKGROUND

Detectors responsive to electromagnetic radiation generally include an array of pixels, each pixel being operable to generate or pass a current in response to electromagnetic energy incident upon the pixel. Typically, the generated or passed current is proportional to the incident energy. The pixels may be prone to some fluctuation in their response behavior over the life of the detector. An unknown change in performance of the detector could lead to erroneous data regarding measurements of an electromagnetic energy source. Accordingly, regular calibration is desirable to ensure uniformity in measurements. By determining the relative operating performance, calibration is used to correct for pixel to pixel variations (non-uniformity correction) and to correct for changes in the pixel response over time.

Generally, the methods of calibration include placing one or more sources at or near the detector to illuminate the detector. Although calibration in a laboratory environment is typically performed before deployment, regular re-calibration after deployment may be desired to accommodate for changes in pixel response over time.

As detector assemblies of this type are frequently used in space-based imaging devices, a complex calibration system is quite undesirable. Size and weight are important factors in the cost of assembly and launch of these space-based devices. Generally, an increase in size and weight of one component affects the size and weight of the remaining components. Further, the calibration system is typically designed to withstand the forces encountered during launch and deployment and then repeated operation requests without being easily serviceable. There are also a number of existing elements that are desired for detector functionality, such as spectral filter wheels and guidance systems. Providing calibration without compromising existing systems has proven challenging as well.

FIGS. 1 and 2 illustrate a conventional system 100 used for calibrating detector 102. FIG. 1 illustrates the calibration system 100 in a non-calibration mode of operation, while FIG. 2 illustrates the calibration system 100 in a calibration mode of operation. System 100 includes a source assembly 108 having one or more light sources 112 (e.g., light sources 112A-C), a mirror 110 and a detector 102. The light source 112 is configured to emit light. The mirror 110 is configured to receive the light from the source 112 and redirect or reflect the light to the detector 102.

System 100 also includes two mechanisms that are used for calibrating detector 102. These mechanisms include a source assembly rotation mechanism 104 and a mirror rotation mechanism 106. The source assembly rotation mechanism 104 rotates or moves light source 112 to illuminate mirror 110 and thus detector 102. That is, the source assembly rotation mechanism 104 directs the Field of View (FOV) of detector 102 at the source 112. The mirror rotation mechanism 106 rotates or moves mirror 110 into the incoming light path from source 112 so that the mirror 110 receives the light from the source 112, and redirects that light onto the detector 102.

During calibration mode of the system 100, as shown in FIG. 2, the source 112B is moved or rotated by the source assembly rotation mechanism 104, and the mirror 110 is moved or rotated by the mirror rotation mechanism 108 such that the light emitted by the source 112B is received by the mirror 110, and the received light is reflected by the mirror 110 onto the detector 102. Also, during calibration mode, the source 112A is moved or rotated such that the light emitted by the source 112A is received by the mirror 110 and reflected by the mirror 110 onto the detector 102, finally the source 112C is moved or rotated such that the light emitted by the source 112C is received by the mirror 110 and reflected by the mirror 110 onto the detector 102 to complete the calibration sequence.

These two discrete mechanisms (i.e., the source assembly rotation mechanism 104 and the mirror rotation mechanism 106) used for calibrating the detector 102 add complexity to the system 100 and introduce additional reliability concerns over a single mechanism. Embodiments of the present disclosure provide improvements over the conventional calibrating systems.

SUMMARY

Aspects and embodiments are directed to a calibrating system that provides the same calibration function and accuracy as conventional calibration systems discussed with reference to FIGS. 1 and 2, but includes a smaller number of components. According to various embodiments, the calibration system includes a multiple position flip-in mirror calibrator that performs calibration functions that conventionally require two distinct mechanisms. The multiple position flip-in mirror calibrator moves or rotates a single mirror to calibrate a detector by directing emitted radiation from one or more radiation sources towards the detector. The smaller number of components in the multiple position flip-in mirror calibrator reduces the overall weight and size of the system. The reduction in the number of components results in a more robust system for space-based calibrating applications.

According to one embodiment, a calibration system for a detector comprises a plurality of radiation sources configured to emit electromagnetic radiation, a positioning mechanism disposed opposite the plurality of radiation sources, having a single degree of freedom with respect to the plurality of radiation sources, and an optical element coupled to the positioning mechanism, and configured to rotate to a plurality of calibration positions, the optical element in each of the plurality of calibration positions being configured to receive the electromagnetic radiation from a corresponding radiation source and to reflect the electromagnetic radiation to the detector.

In one example, the optical element includes a single mirror. In addition, the plurality of radiation sources include three radiation sources and the plurality of calibration positions may include three calibration positions, wherein in each of the three calibration positions the electromagnetic radiation is reflected by the optical element from one of the three radiation sources. In this example, a prescription of the single mirror is optimized for one of the three radiation sources. In addition, the plurality of radiation sources, the optical element and the detector may form an optical path.

In another example, the optical element may be configured to move to a non-calibration position, in which the optical element is stowed outside of the optical path. In addition, the optical element may be configured to move from the non-calibration position to one of the three calibration positions, wherein the three calibration positions are located at a predetermined angle of rotation from the non-calibration position.

In one example, the optical element is rotatable by the positioning mechanism about an internal axis. The calibration system may further include a base member and the plurality of radiation sources are fixedly attached to the base member. In this example, each radiation source further includes a thermal isolator, wherein each thermal isolator is fixedly attached to the base member.

In another example, the base member may further include a plurality of features, each feature having an angle with regard to the base member, and each feature is attached to each thermal isolator. In this example, each angle may be configured to allow each radiation source to direct the electromagnetic radiation to the optical element in each of the plurality of calibration positions.

In one example, the calibration system further comprises a source housing, wherein the source housing is disposed between the positioning mechanism and the base member. In this example, the calibration system further comprises at least one thermal sink isolator coupled between the source housing and the base member, wherein the at least one thermal sink isolator is configured to allow for heat transfer from the base member to the source housing.

In another example, each of the radiation sources included in the plurality of radiation sources emits radiation having a different wavelength. In addition, the plurality of radiation sources may include at least one black body source. In this example, the at least one black body source includes a hot black body source, a relatively cold black body source and an ambient black body source. In another example, the detector is an infrared sensor responsive to infrared radiation. In addition, the plurality of radiation sources may include at least one of a visible light radiation source and an infrared radiation source.

According to another embodiment, a method of calibrating a detector using a calibration system, the calibration system including a plurality of radiation sources, and an optical element is disclosed. The method comprises rotating the optical element into a plurality of calibration positions, the optical element having a single degree of freedom with reference to the plurality of radiation sources, receiving, by the optical element, electromagnetic radiation from one of the plurality of radiation sources, and reflecting, by the optical element, the electromagnetic radiation from one of the plurality of radiation sources to a detector, wherein the electromagnetic radiation is reflected by the optical element from one of the plurality of radiation sources in each of the plurality of calibration positions.

In another example, the method further comprises rotating the optical element into a first calibration position corresponding to a first radiation source, receiving, by the optical element, electromagnetic radiation from the radiation source, reflecting, by the optical element, the electromagnetic radiation from the first radiation source to the detector, and rotating the optical element into a second calibration position corresponding to a second radiation source.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures.

DETAILED DESCRIPTION

Figure 1:
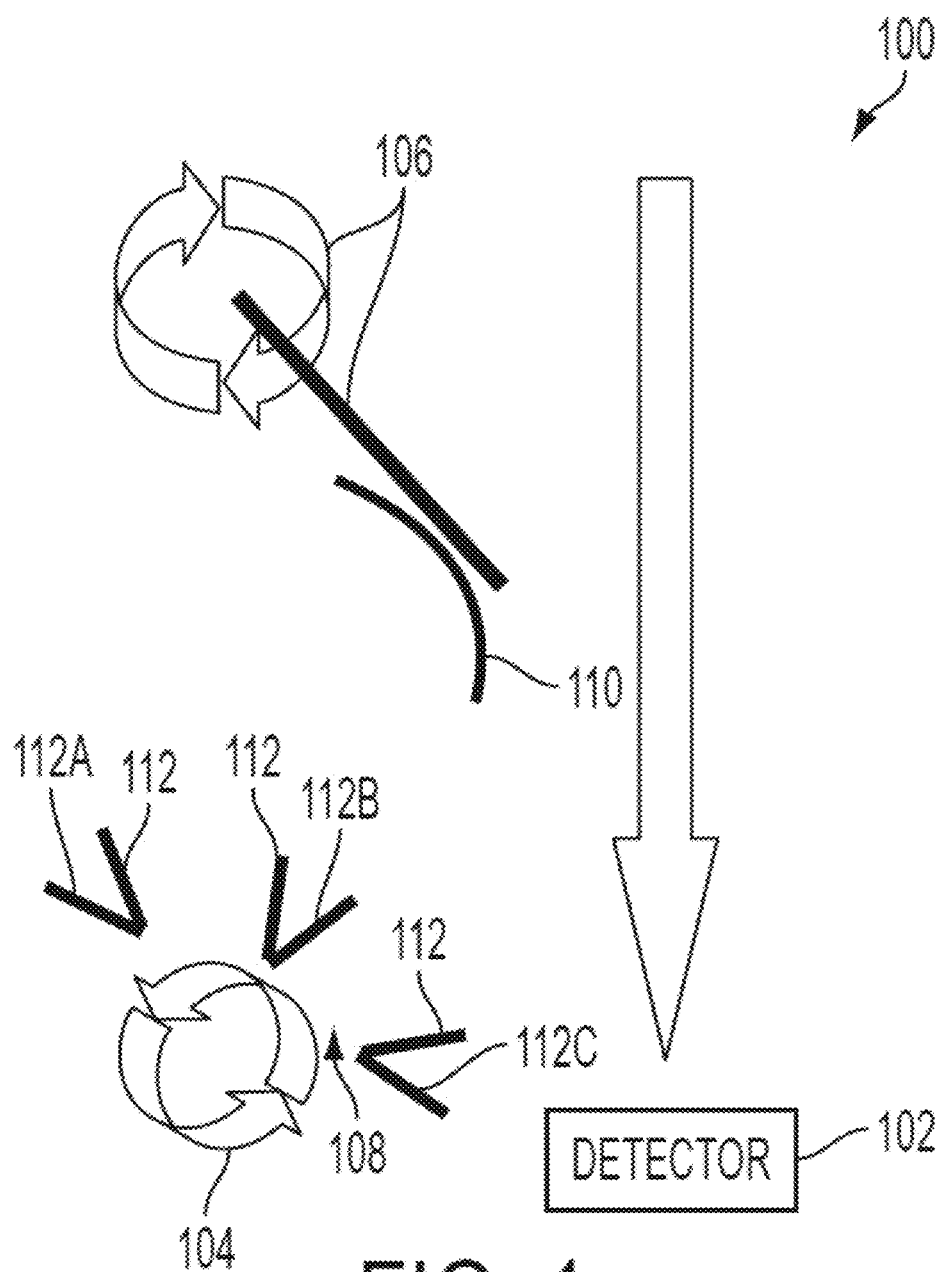
FIG. 1 is a diagram of one example of a conventional system of calibrating a sensor in a non-calibration mode of operation.
Figure 2:
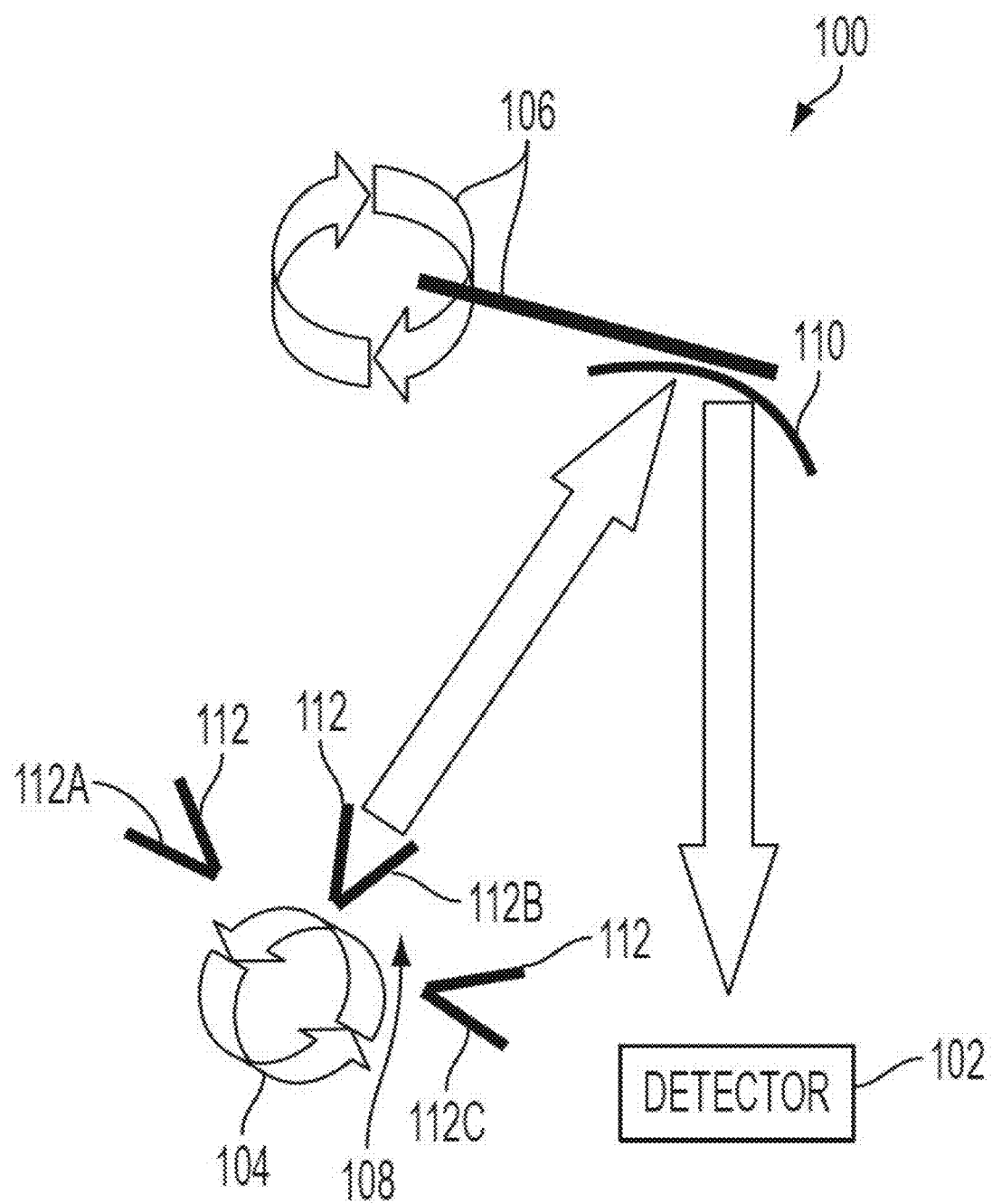
FIG. 2 is a diagram of one example of the conventional calibrating system of FIG. 1 in a calibration mode of operation.

The conventional calibrating system described in reference to FIGS. 1 and 2 uses two discrete mechanisms to calibrate the detector, and therefore has at least two degrees of freedom. One mechanism moves the mirror into incoming the optical path (i.e., from source) and another mechanism moves or rotates the source(s). The use of two discrete mechanisms results in the conventional calibrating systems having added complexity, introducing additional reliability concerns for space-based calibration applications.

Aspects and embodiments are directed to a calibrating system for calibrating a detector using multiple radiation sources. As described further below, the calibration system includes a multiple position flip-in mirror calibrator that performs a calibration function, which conventionally requires two distinct mechanisms. In the conventional systems, one mechanism "flips" into the incoming optical path for calibration and another either rotates calibration sources, or points to stationary calibration sources. The multiple position flip in mirror calibrator, as disclosed further below, flips in a mirror from a stowed position to point to a first stationary calibration source, then rotates further to point to a second calibration source. This process can then be repeated for additional sources. The calibration system described herein reduces the complexity of the system by eliminating one of the mechanisms and by including stationary calibration sources. As discussed further below, stationary calibration sources allow for a more efficient thermal control of the calibration system. The calibration system disclosed herein may be used in space applications. For example, such calibration system may be used for on-board calibration of sensors mounted on a spacecraft.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 3:
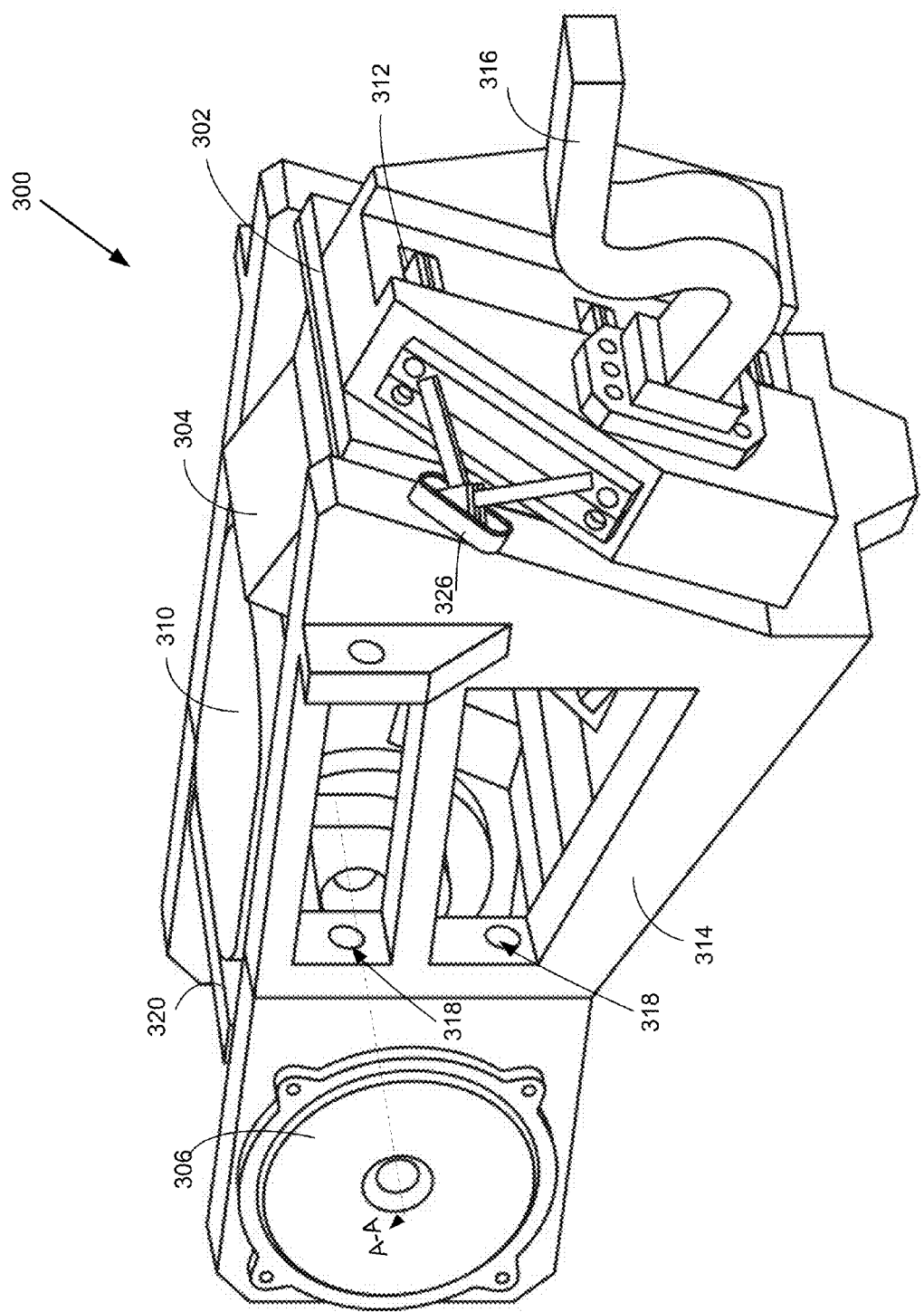
FIG. 3 is an isometric view diagram of one example of a calibration system in a non-calibration mode of operation, according to aspects of the present invention.
Figure 4:
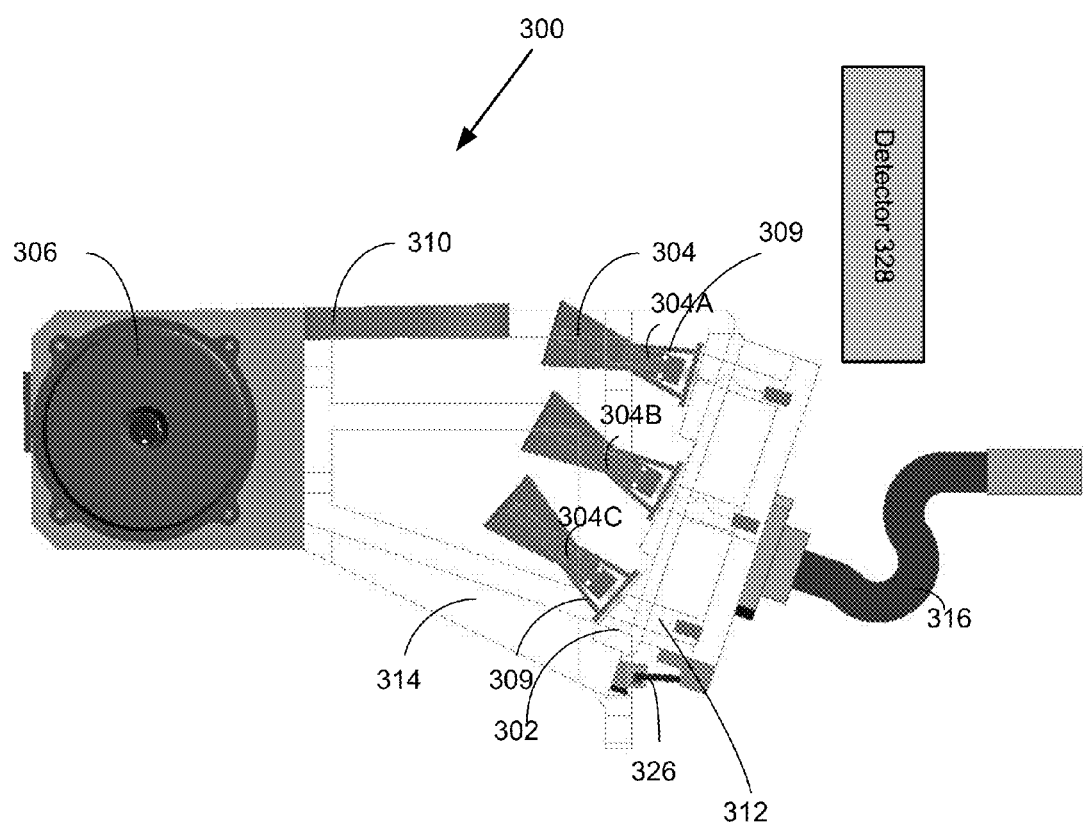
FIG. 4 is a diagram of one example of a calibration system in a non-calibration mode of operation, according to aspects of the present invention.

FIGS. 3 and 4 illustrate a calibration system 300 for a detector 328 (shown in FIG. 4) in accordance with one embodiment. The calibration system 300 includes one or more radiation sources 304 attached to a base member 302, and a positioning mechanism 306 attached to an optical element 310. The optical element 310 is attached to a movable member 320, which is coupled to the positioning mechanism 306. As shown in FIG. 4, the radiation sources 304 include radiation sources 304A, 304B and 304C positioned opposite the positioning mechanism 306. The radiation sources 304 are each attached to the source base member 302 with thermal isolators 309. The source base member 302 contains a hole for each of the radiation sources 304A-C, through which a thermal interface link 312 passes through. The thermal interface links 312 connect the radiation sources 304 to the source base member 302 for thermal control of the radiation sources 304. The hole in the source base member 302 allows for longer thermal interface links 312, which provide more flexibility for their design and allow for easy control of the operating temperature of the radiation sources 304.

Further as shown, a thermal strap 316 is connected to one side of the source base member 302 opposite the radiation sources 304 and may further be connected to a cold thermal interface (not shown). In other implementations, three discrete thermal straps may be attached to radiation sources 304A, 304B and 304C and connected to the cold thermal interface (not shown) in the place of base member 302 and the single thermal strap 316. As further discussed below, a source housing 314 is coupled to both the base member 302 and the positioning mechanism 306 and provides precise alignment of the radiation sources 304 with the positioning mechanism 306. Source housing 314 may also allow the calibration system 300 to be attached to the other systems using mechanical interfaces 318. The thermal strap 316 is attached to a relatively cold thermal interface in order to dissipate any heat generated by the radiation sources 304.

The positioning mechanism 306 is configured to rotate the optical element 310 into one of the three calibration positions and a non-calibration position in a calibration sequence, described in more detail below. Each calibration position in the calibration sequence corresponds to the optical element 310 pointed in the direction of one of the radiation sources 304A-C. An optical path is formed between each of the radiation elements 304A-C, the optical element 310 and the detector 328 in each calibration position during the calibration sequence.

Figure 5:
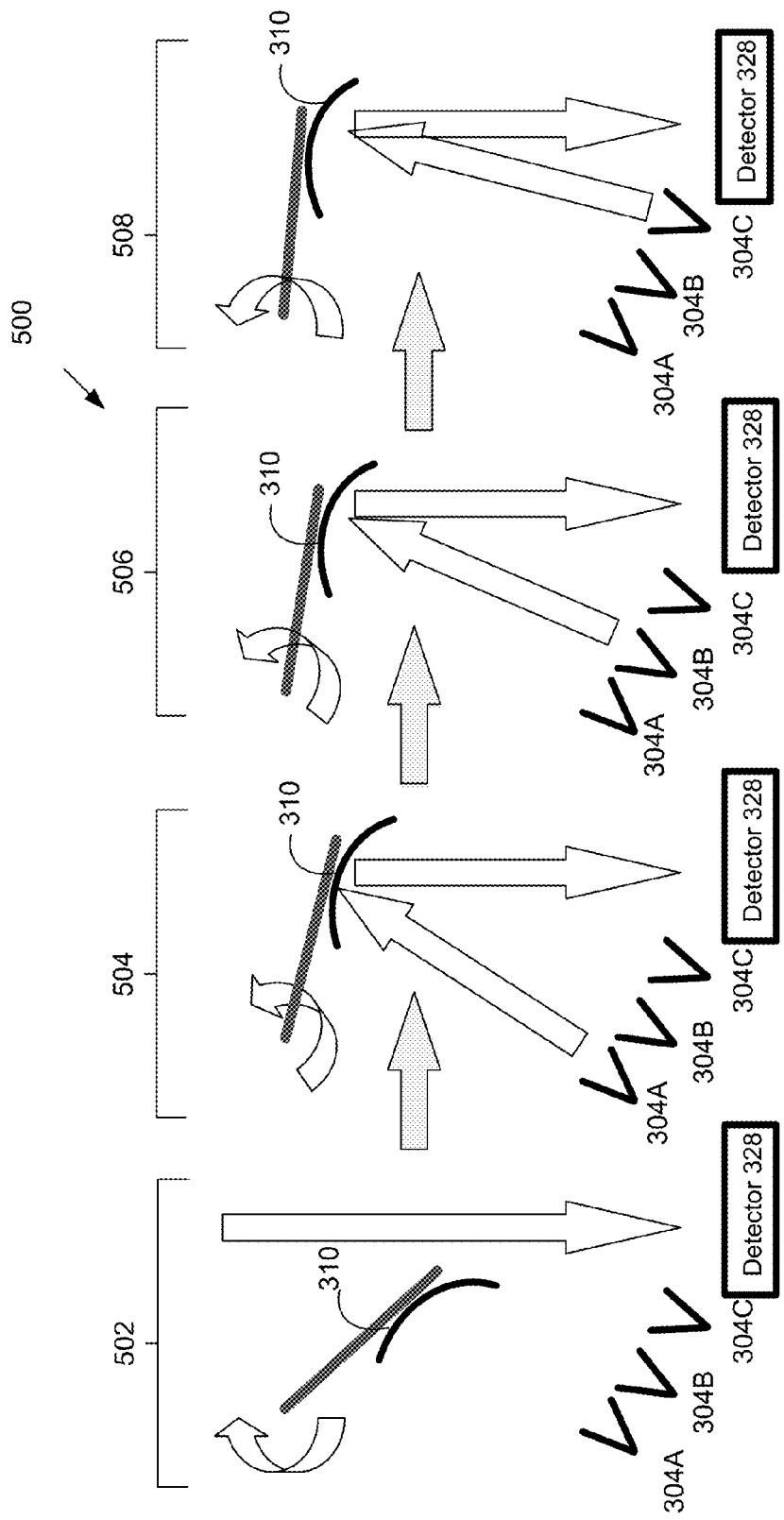
FIG. 5 is a diagram of one example of a calibration sequence of a calibration system, according to aspects of the present invention.

One example of a calibration sequence 500 is shown in FIG. 5. During normal system operations, the calibration system 300 is in the non-calibration (or stand-by) position 502. In the stand-by position, the optical element 310 is positioned so that radiation from the radiation elements 304A-C is directed away from the detector 328. From the non-calibration position 502, the optical element 310 is rotated to a first calibration position 504 to receive radiation from the radiation source 304A and direct the radiation to the detector 328. From the first calibration position 504, the optical element 310 is rotated to a second calibration position 506 to receive radiation from the radiation source 304B and direct the radiation to the detector 328. From the second calibration position 506, the optical element 310 is rotated to a third calibration position 508 and is configured to receive radiation from the radiation source 304C and direct the radiation to the detector 328. Finally, from the third calibration position 508, the optical element 310 is rotated back to the non-calibration position 502 to return to stand-by mode. It is appreciated that the calibration sequence may not be limited to what is shown in FIG. 5. For example, the calibrator system 300 may change position between positions 504, 506 and 508 in any combination that is desired for the application.

Additionally, the calibration system 300 is not limited to calibrating only once at any one position (504, 506 or 508) during the overall calibration sequence. For example, the calibration sequence include non-calibration position 502, followed by the third calibration position 508, followed by the second calibration position 506, then followed by the first calibration position 504, then followed by the second 506, followed again by the third calibration position 508, and finally returning to the non-calibration 502 or any other combination of calibration positions as desired.

Referring again to FIG. 3, in one embodiment, the optical element 310 is configured to rotate around an internal axis A-A of the positioning mechanism 306 to position the movable member 320 and optical element 310 in the direction of the radiation sources 304. The optical element may comprise a mirror that is attached to the positioning mechanism 306. In one embodiment, optical element 310 is a positively powered mirror configured to focus radiation energy from each of the radiation sources 304. In one embodiment, the optical element 310 may be configured to receive radiation from all radiation sources 304 in a way that minimizes potential optical aberrations and provides uniform radiation energy onto the detector 328. In some embodiments, the optical element 310 includes a prescription that is optimized for one of the radiation sources 304, while configured to receive the radiation energy from the remaining radiation sources provide uniform radiation energy onto the detector 328. For example, the optical element 310 may be optimized for the radiation source 304B, while still able to receive the radiation energy from radiation sources 304A and 304C.

In this embodiment, the single reflective optical element 310 may be used with different radiation source types across a wide range of the electromagnetic spectrum, including, visible (VIS), visible-near (VIS/NIR), short wavelength infrared (SWIR), mid-wavelength infrared (MWIR), long wavelength infrared (LWIR) and very long wavelength infrared (VLWIR).

In one embodiment, the calibration system 300 may include a beam splitter (not shown), configured to direct a portion of radiation energy from one or more radiation sources 304 to the detector 328. The beam splitter may be configured to receive and transmit radiation energy of one wavelength from a radiation source 304 toward the detector 328, while reflecting radiation energy of another wavelength toward detector 328. This would allow for the simultaneous calibration of the detector 328 by two different radiation sources 304.

In another embodiment, the calibration system 300 may include two detectors 328 that respond to different ranges in the electromagnetic spectrum. A beam splitter (not shown) could be implemented between optical element 310 and the two detectors 328 that may enable the simultaneous calibration of two detectors 328 by each of the radiation sources 304. The beam splitter would allow for the transmission of energy from one radiation source 304 to one detector 328 and would reflect energy of a different wavelength to another detector 328. This would enable the calibration system to calibrate two different detectors 328 that respond to different wavelengths in the electromagnetic spectrum simultaneously with multiple radiation sources 304.

According to one embodiment, the optical element 310 is attached to the rotatable member 320 and rotated by the positioning mechanism 306 with respect to the internal axis A-A (shown in FIG. 3). The positioning mechanism 306 may be configured to rotate the movable member 320, and thus the optical element 310, to any position to reflect radiation from the radiation sources 304 onto the detector, for example between approximately zero and 90 degrees about the axis A-A. The optical element 310 in the non-calibration position shown in FIG. 3 may used as the zero degree reference point.

In one embodiment, the positioning mechanism 306 further includes a motor and resolver assembly (not shown). The movable member 320 is operatively connected to motor and resolver assembly. The motor is configured to vary the position of movable member 320, which in turn translates to the movement of the optical element 310 with respect to source base member 302 and the radiation sources 304. In one embodiment, the motor may be a stepper motor configured to supply a drive force and to facilitate variable positioning of the optical element 310. In one embodiment, the motor is operational under the direction of a control system (not shown) to move or rotate the optical element 310 for calibration purposes. Motor and resolver assembly may also include a resolver that is configured to sense the position of the motor, e.g., rotational position, and to determine the position of the optical element 310. The resolver may send the positional information of the optical element 310 to the control system, which in response controls the operation of the motor.

In one embodiment, detector 328 is an infrared sensor configured to be responsive to infrared radiation. The infrared sensor may be configured to be responsive to mid wavelength infrared radiation, short wave infrared radiation, or long wavelength infrared radiation. For example, detector 328 may be a mid wavelength infrared sensor configured to be responsive to mid wavelength infrared radiation. In another embodiment, detector 328 may be configured to be responsive to the electromagnetic radiation from different types of radiation sources 304. For example, detector may include a detector configured to be responsive to visible light or a hyperspectral detector. Detector 328 may be a visible detector configured to be responsive to the electromagnetic radiation from different visible sources. As described further below, different types of radiation sources may be simultaneously implemented into the calibration system 300, for example, a visible light radiation source, a mid wavelength infrared radiation source, and a long wavelength radiation source.

As discussed above, each of the radiation sources 304A, 304B and 304C is positioned such that the detector 328 receives the electromagnetic radiation one of the radiation sources 304 via the optical element 310 in each corresponding calibration position. Each radiation source 304 may be any source of electromagnetic radiation or energy capable of emitting a sufficient amount of electromagnetic radiation or energy for detection by detector 328. In one embodiment, the radiation sources 304A-C may be the same size. In another embodiment, each radiation source 304A-C may be a different size.

The radiation sources 304 may include two or more different types of radiation sources, such as a visible light radiation source, a short wavelength infrared radiation source, a long wavelength radiation source or any suitable type of radiation source. For example, the visible light radiation sources are configured to provide visible or near-visible radiation. The infrared radiation sources may be configured to provide short wavelength infrared radiation, mid wavelength infrared radiation, long wavelength infrared radiation and/or very long wavelength infrared radiation. The radiation sources 304 may include one or more blackbody sources 304 for a detector 328 that responds to infrared energy and one source that include Light Emitting Diodes (LEDs), laser diodes, and/or combinations thereof to calibrate a detector 328 that responds to visible energy.

According to some embodiments, each black body radiation source 304 may be maintained at a different temperature. For example, three radiation sources 304A-C may include a hot blackbody source 304C maintained within a temperature range of 350K-400K, an ambient blackbody source 304B maintained within a temperature range of 290K-310K and a cold blackbody source 304A maintained within a temperature range of 260K-275K. In one embodiment, ambient blackbody source 304B is maintained at a temperature range that is between the temperature range of the hot blackbody source 304C and the cold blackbody source 304A.

According to various embodiments, the radiation sources are stationary relative to the positioning mechanism 306. Contrary to the sources illustrated in FIG. 2, the sources described herein are stationary relative to their control system so that a cable wrap is not required to connect the control cable signals (telemetry and power) across the source mechanism 104.

For example, in one embodiment, the discrete radiation sources are made of thermally conductive material (e.g., Aluminum or Copper) and are coated black (painted or otherwise coated). The temperature and thermal gradients of these discrete radiation sources may be carefully controlled and measured. Because the temperature of the radiation sources is at either above or below an environmental temperature, thermal cooling or heating is desired to maintain the temperature of these radiation sources. In a vacuum, conduction is an efficient method of thermal heat transfer. Radiation, which is less efficient than the conduction, takes over as the dominate heat transfer methodology after the conduction. Because the thermal connection between the radiation sources and their thermal interfaces is conductive, in the case of the cold radiation source, the thermal interface temperature to the radiation source does not need to be as cold as if it were connected radiatively (e.g., via a radiative link) as would be the case if the black bodies were on a rotation stage. Therefore, maintaining stationary black bodies (radiation sources) is more thermally efficient.

The source base member 302 may further include features to which the thermal isolators 309 are mounted. Each of the mounting features corresponds to each of the radiation sources 304 and each may include a directional angle. Each directional angle corresponds to one of the calibration positions of the optical element 310 and allows the corresponding radiation source 304 to direct the emission of radiation to the optical element 310 in each of the calibration positions. As described above, the source base member 302 includes one or more holes, which are configured to allow the thermal interface links 312 to pass through the to the source base member 302 and connect the radiation sources 304 to the source base member 302.

In one embodiment, the source base member 302 is attached to the source housing 314 via the thermal sink isolators 326 and the radiation sources 304 are attached to the source base member 302 via discrete the thermal isolators 309. The source base member 302 may also be configured to act as a mechanical interface between different types of radiation sources, as described above. In one embodiment, different portions of the source base member 302 may be segregated from each other to provide for more efficient cooling of the radiation sources. In one example, there are limitations to how much power various radiator interfaces reject, and the segregation of these radiator interfaces may allow for a single more efficient radiator ("cold") to be used to passively cool a cold black body source.

As illustrated in FIGS. 3 and 4, the source housing 314 is used to precisely connect the positioning mechanism 306 to the source base member 302 via the thermal sink isolators 326. As noted above, the source housing 314 further allows attachment of the calibration system 300 to an external mechanical interface (not shown). The source housing 314 is a single machined metal part that is used to hold tight, positional tolerances between the positioning mechanism 306 and the radiation sources 304. The source housing 314 is a customized component that may be different for each design implementation and may depend on the dimensions of the positioning mechanism 306, the prescription of the optical element 310 and the number and size of the radiation sources 304. The source housing 314 shown in FIG. 3 is one example of the configuration of the source housing and it should be appreciated that the source housing 314 may include other configurations, for example to accommodate different designs, sizes and optical prescription, as described above.

The calibration system 300 may also include a one or more baffles (not shown). Each baffle may be disposed between radiation sources 304 so that the radiation emitted from each radiation source is separated from the remaining sources. The baffles may prevent stray light from non-calibrating radiation sources to be reflected on the optical element 310.

Figure 6:
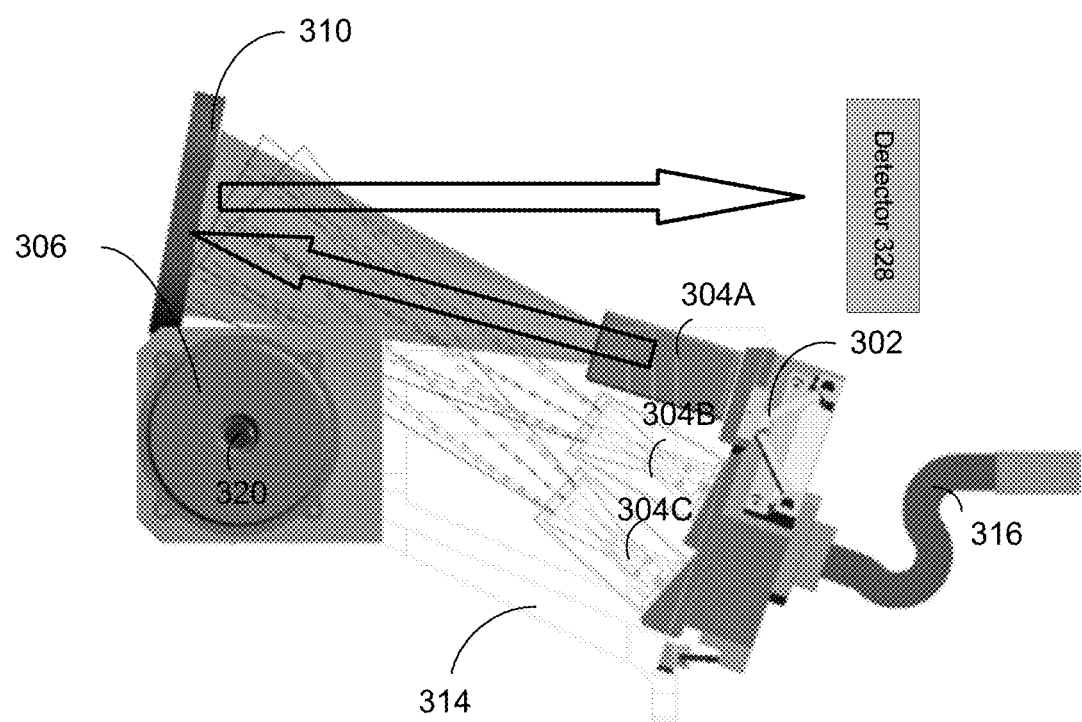
FIG. 6 is a diagram of one example of a calibration system in a first calibration mode of operation, according to aspects of the present invention.
Figure 7:
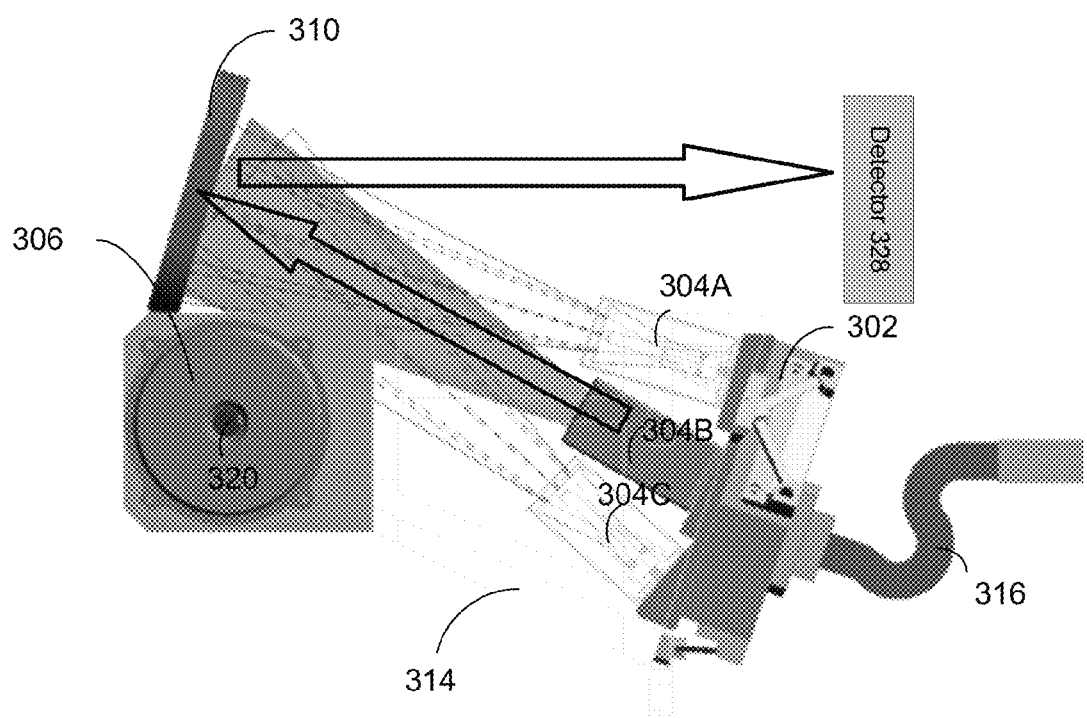
FIG. 7 is a diagram of one example of a calibration system in a second calibration mode of operation, according to aspects of the present invention.
Figure 8:
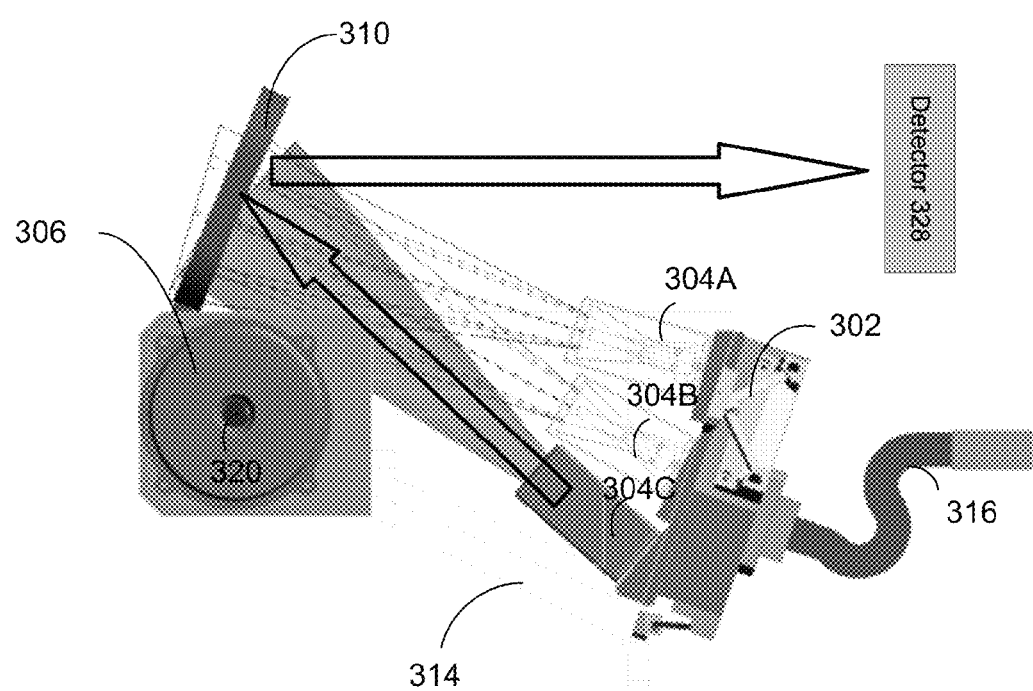
FIG. 8 is a diagram of one example of a calibration system in a third calibration mode of operation, according to aspects of the present invention.

As noted above, the optical element 310 is configured to be movable between one or more calibration positions and a non-calibration position (or a stowed position). FIGS. 3 and 4 show the optical element 310 in a non-calibration position, while FIGS. 6-8 show the optical element in various calibration positions. FIG. 4 illustrates the calibration system 300 including the optical element 310 in a non-calibration mode of operation in accordance with an embodiment. In one embodiment, in the non-calibration mode of operation, the optical element 310 is rotated out of the optical path and stowed inside the source housing 314, which constitutes a protective environment. The non-calibration mode may allow for greater thermal stability of optical element by controlling the thermal environment that the optical element experiences in between calibrations.

FIG. 6 illustrates the calibrating system of FIGS. 3 and 4, including the optical element 310 in a first calibration mode of operation in accordance with an embodiment. Calibration may be initiated by rotating the optical element 310 from a stowed or non-calibrating position into a first operational position by controlling the motor and resolver assembly to move or rotate the optical element into the first operational position. The first calibration position is a predetermined angle of rotation from the non-calibration position. In one embodiment, the angle of the rotation of the optical element 310 in the first position depends on the angle of the corresponding radiation source 304A.

When the optical element 310 is in the first operational position, as shown in FIG. 6, the optical element 310 is configured to receive the electromagnetic energy from its corresponding radiation source 304A and to reflect the electromagnetic radiation or energy to detector 328. During the calibration process, as illustrated in FIG. 6, the optical element 310 is moved, while blackbody sources 304A-C remain stationary.

FIG. 7 illustrates the calibrating system of FIGS. 3 and 4, including the optical element 310 in a second calibration mode of operation in accordance with an embodiment. The optical element 310 is rotated or moved from the first operational position, as shown in FIG. 6, to a second operational position, as shown in FIG. 7 by controlling the motor and resolver assembly of the positioning mechanism 306 configured to move or rotate the optical element 310 to the second operational position. In one embodiment, the optical element 310 is rotated from the first operational position to the second operational position.

When the optical element 310 is in the second operational position, as shown in FIG. 7, the optical element 310 is configured to receive the electromagnetic radiation or energy from the radiation source 304B and to reflect the electromagnetic radiation or energy to detector 328. During the calibration process, as illustrated in FIG. 7, the optical element 310 is moved, while blackbody sources 304A-C remain stationary. The second calibration position is a predetermined angle of rotation from the first calibration position. In one embodiment, the angle of the rotation of the optical element 310 in the second position depends on the angle of the corresponding radiation source 304B.

FIG. 8 illustrates the calibrating system of FIGS. 3 and 4, including the optical element 310 in a third calibration mode of operation in accordance with an embodiment. In the third calibration mode, the optical element 310 is rotated or moved from the second operational position, as shown in FIG. 7, to a third operational position, as shown in FIG. 8, by controlling motor and resolver assembly of the positioning mechanism 306 configured to move or rotate the optical element 310 to the third operational position.

When the optical element 310 is in the third operational position, as shown in FIG. 8, the optical element 310 is configured to receive the electromagnetic radiation or energy from its corresponding radiation source 304C and to reflect the electromagnetic radiation or energy to detector 328. During the calibration process, as illustrated in FIG. 8, only the optical element 310 is moved, while the radiation sources 304A-C remain stationary. After the calibration is performed in the third operational position, the optical element 310 may be rotated in the opposite direction to move the optical element 310 into the stowed position (i.e., out of the optical path), as shown in FIG. 6.

Alternatively, in another embodiment, the optical element 310 may be moved or rotated from the non-calibration or stowed position to the third calibration position, with the radiation source 304C in calibration mode. From the third calibration position the optical element 310 may be rotated to the second calibration position, with the radiation source 304B is in calibration mode. From the second calibration position, the optical element 310 may be rotated to the first calibration position, with the radiation source 304A in calibration mode. It is appreciated that any sequence of calibration positions may be created according to any desired the operation of the calibration system.

In the embodiment, as shown in FIGS. 4-8, the calibration system 300 described above includes three radiation sources. However, it is contemplated that principles of the present disclosure may equally applicable to a calibration system having any number of radiation sources. In such a calibration system, the optical element 310 may be moved or rotated into a corresponding number of operational positions (instead of three).

In the illustrated embodiment, as shown in FIGS. 3-8 and described above, the positioning mechanism 306, rotating the movable member 320 and optical element 310, has a single degree of freedom with respect to the base member 302. The single degree of freedom may refer to the translation of the optical element 310 with reference to only one direction, for example, the rotation of the optical element 310 about only one axis (e.g. the A-A axis of FIG. 3). However, it is contemplated that principles of the present disclosure may be applicable to a system in which the optical element 310 is configured to linearly or axially move along any one of the X, Y and Z directions for calibrating the detector. For example, the optical element 310 may translated linearly along a direction (X, Y or Z) located perpendicular to the radiation sources and the detector. In this example, the optical element may be moved into two or more different operational positions located along the linear direction. In each operational position, the optical element is configured to receive the electromagnetic radiation or energy from its corresponding radiation source and to reflect the electromagnetic radiation or energy to detector 328.

As described above, the calibration system disclosed herein uses only one mechanism, instead of two mechanisms used conventionally, for performing calibration of the detector, such as the infrared sensor or the broadband detector. As described, the calibration system includes a single optical element which rotated into the optical path of different stationary radiation sources. The described calibration system may be scalable to radiation sources of any size. Specifically, the use of a single optical element may allow for the calibration system to be scalable for considerably larger radiation sources. In addition, the single optical element may be relatively inexpensive and may provide additional space and packaging benefits.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A calibration system for a detector, the calibration system comprising:

a plurality of radiation sources configured to emit electromagnetic radiation;

a positioning mechanism disposed opposite the plurality of radiation sources, having a single degree of freedom with respect to the plurality of radiation sources;

a source housing disposed adjacent the positioning mechanism; and a single mirror coupled to the positioning mechanism, and configured to rotate to a plurality of calibration positions outside the source housing, the single mirror in each of the plurality of calibration positions being configured to receive the electromagnetic radiation from a corresponding radiation source and to reflect the electromagnetic radiation to the detector, wherein the single mirror is the only mirror incorporated within the calibration system, wherein the single mirror and the detector form an optical path, wherein the positioning mechanism is configured to move the single mirror to a non-calibration position, in which the single mirror is stowed inside the source housing, outside of the optical path, and in which the single mirror does not reflect electromagnetic radiation to the detector, and wherein the source housing is configured to provide a protective environment for the single mirror in the non-calibration position.

2. The calibration system of claim 1, wherein the plurality of radiation sources includes three radiation sources and the plurality of calibration positions includes three calibration positions, wherein in each of the three calibration positions the electromagnetic radiation is reflected by the single mirror from one of the three radiation sources.

3. The calibration system of claim 2, wherein a prescription of the single mirror is optimized for one of the three radiation sources.

4. The calibration system of claim 2, wherein the single mirror is configured to move from the non-calibration position to one of the three calibration positions, wherein the three calibration positions are located at a predetermined angle of rotation from the non-calibration position.

5. The calibration system of claim 1, wherein the single mirror is rotatable by the positioning mechanism about an internal axis.

6. The calibration system of claim 1, further including a base member, wherein the plurality of radiation sources are fixedly attached to the base member.

7. The calibration system of claim 6, wherein each radiation source further includes a thermal isolator, wherein each thermal isolator is fixedly attached to the base member.

8. The calibration system of claim 7, wherein the base member further includes a plurality of features, each feature having an angle with regard to the base member, and each feature is attached to each thermal isolator.

9. The calibration system of claim 8, wherein each angle is configured to allow each radiation source to direct the electromagnetic radiation to the single mirror in each of the plurality of calibration positions.

10. The calibration system of claim 6, wherein the source housing is disposed between the positioning mechanism and the base member.

11. The calibration system of claim 10, further comprising at least one thermal sink isolator coupled between the source housing and the base member, wherein the at least one thermal sink isolator is configured to allow for heat transfer from the base member to the source housing.

12. The calibration system of claim 1, wherein each of the radiation sources included in the plurality of radiation sources emits radiation having a different wavelength.

13. The calibration system of claim 1, wherein the plurality of radiation sources includes at least one black body source.

14. The calibration system of claim 13, wherein the at least one black body source includes a hot black body source, a relatively cold black body source and an ambient black body source.

15. The calibration system of claim 1, wherein the detector is an infrared sensor responsive to infrared radiation.

16. The calibration system of claim 1, wherein the plurality of radiation sources includes at least one of a visible light radiation source and an infrared radiation source.

17. A method of calibrating a detector using a calibration system, the calibration system including a plurality of radiation sources, a source housing, and a single mirror, wherein the single mirror is the only mirror incorporated within the calibration system, the method comprising:

rotating the single mirror into a plurality of calibration positions outside the source housing, the single mirror having a single degree of freedom with reference to the plurality of radiation sources;

receiving, by the single mirror, electromagnetic radiation from one of the plurality of radiation sources;

reflecting, by the single mirror, the electromagnetic radiation from one of the plurality of radiation sources to a detector;

rotating the single mirror to a non-calibration position, in which the single mirror is stowed within the source housing and in which the signal mirror does not reflect electromagnetic radiation to the detector; and providing, with the source housing, a protective environment for the single mirror in the non-calibration position, wherein the electromagnetic radiation is reflected by the single mirror from one of the plurality of radiation sources in each of the plurality of calibration positions.

18. The method of claim 17, further comprising:

rotating the single mirror into a first calibration position corresponding to a first radiation source;

receiving, by the single mirror, electromagnetic radiation from the radiation source;

reflecting, by the single mirror, the electromagnetic radiation from the first radiation source to the detector; and rotating the single mirror into a second calibration position corresponding to a second radiation source.

\* \* \* \* \*